(12) United States Patent
Anderberg

(10) Patent No.: US 6,695,315 B1
(45) Date of Patent: Feb. 24, 2004

(54) SINGLE SEAL

(76) Inventor: Goran Anderberg, Strandvagen 303, S-261 61 Landskrona (SE)

(*) Notice: Subject to any disclaimer, the term of this patent is extended or adjusted under 35 U.S.C. 154(b) by 0 days.

(21) Appl. No.: 09/787,091
(22) PCT Filed: Oct. 7, 1999
(86) PCT No.: PCT/SE99/01791
§ 371 (c)(1), (2), (4) Date: May 8, 2001
(87) PCT Pub. No.: WO00/20782
PCT Pub. Date: Apr. 13, 2000

(30) Foreign Application Priority Data

Oct. 8, 1998 (SE) .............................................. 9803436

(51) Int. Cl.$^7$ ................................................ F16J 15/34
(52) U.S. Cl. ........................ 277/369; 277/370; 277/373
(58) Field of Search ................................ 277/369, 379, 277/383, 352, 370, 373

(56) References Cited

U.S. PATENT DOCUMENTS

| 2,158,832 A | 5/1939 | Podbielniak |
| 2,682,422 A | * 6/1954 | McBride |
| 5,020,809 A | * 6/1991 | Mullaney |
| 5,480,160 A | 1/1996 | Harms |
| 5,927,722 A | * 7/1999 | Carmody et al. |

FOREIGN PATENT DOCUMENTS

EP 0 403 676 A1 * 7/1989

* cited by examiner

Primary Examiner—Anthony Knight
Assistant Examiner—E Peavey
(74) Attorney, Agent, or Firm—Ladas & Parry

(57) ABSTRACT

The invention relates to a single seal, and more specifically to a seal for a rotary shaft extending through a wall, e.g. that of a pump housing. The single seal exhibits one single sealing location between a fixed and a rotary sealing ring. The seal is fitted onto the wall by means of a flange in order to seal off a chamber inside the wall against the shaft and towards the exterior. According to the invention, the single seal exhibits an outer sealing ring (1) and an inner sealing ring (2). These sealing rings are in sliding and sealing contact with each other. The outer sealing ring (1) is fastened to the flange (12) and the inner sealing ring (2) is fastened to an axially displaceable sleeve (8). The sleeve is in turn affixed to and rotating with the shaft (22), and extends through the wall and the flange (12). The seal also has a spring device (5) arranged outside the wall and providing a force for increasing the contact between the sealing rings (1, 2).

21 Claims, 2 Drawing Sheets

SINGLE SEAL

FIELD OF THE INVENTION

The present invention relates to a single seal and, more specifically, to a seal for a rotary shaft extending through a wall, e.g. a pump housing wall. The single seal has one single sealing surface between a fixed and a rotary sealing ring. The sealing rings are biased towards each other by means of an axially displaceable sleeve extending through the wall. The biasing force is provided by a spring device arranged outside the pump housing.

STATE OF THE ART

In this context it is previously known to use springs for holding sealing packages together. For example, one such arrangement is described in U.S. Pat. No. 2,158,832. One problem with this arrangement is that the springs are arranged inside the pump housing, i.e. in the pumped medium. On the on hand, the spring arrangement is bulky, and therefore cannot be arranged within a limited space. On the other hand, when pumping liquid media, especially fluid foodstuffs, there is also a problem in that the pumped medium blocks the movement of the spring. The spring arrangement also has several pockets where the pumped medium may collect, causing hygienic problems.

Another known arrangement for sealing of a shaft extending through a wall is shown in U.S. Pat. No. 2,682,422. Compression springs are arranged outside the wall for increasing the pressure on the sealing surfaces. The spring force from the springs is transferred via two sliding rings, of which one ring rotates together with a sleeve extending through the wall. The sleeve transfers the force to the actual sealing rings. Underneath the sleeve there are further seals in the form of box plaits (packing rings) with a grease-packed spring located between them. The arrangement is a complicated construction where compressing the springs must compensate the wearing of the sliding rings. The box plaits also cause the sealing arrangement to have a high edge width.

The present invention resolves the above problems by providing a new design of single seal. Two sealing rings, one fixed and one rotating together with the shaft, are located inside the pump housing for sealing against the shaft and towards the exterior. The inner sealing ring is fastened to a sleeve extending through the pump house wall and is loaded by a tension spring device in order to increase the contact pressure against the outer sealing ring. Thanks to this design, the seal will have a very small edge width inside the pump housing. It also substantially lacks pockets where the medium may collect. The entire spring package is arranged on the atmospheric side so as to avoid the problems in connection with the pumped medium being in contact with the springs. Due to the tension springs, no further slide bearings are necessary to transfer the spring forces to the sleeve and on to the sealing rings.

SUMMARY OF THE INVENTION

The present invention thus provides a single seal for the sealing of a rotating shaft extending through a wall. The seal is mounted on the wall by means of a flange in order to seal off a chamber inside the wall against the shaft and towards the exterior. The single seal exhibits an outer and an inner sealing ring. These sealing rings are in sliding and sealing contact with each other. The outer sealing ring is fastened to the flange and the inner sealing ring is fastened to an axially displaceable sleeve. The sleeve is in turn affixed to and rotating with the shaft, and extends through the wall and the flange. The seal also has a spring device arranged outside the wall and providing a force for increasing the contact between the sealing rings.

According to the invention, the spring device comprises an inner fastening ring affixed to the sleeve and an outer fastening ring affixed to the shaft, whereby tension springs and driving pins are provided between the inner and the outer fastening rings.

The invention is defined in the appended claim 1, whereas advantageous embodiments are defined in the dependent claims.

BRIEF DESCRIPTION OF THE DRAWINGS

The invention will be described in detail hereinafter, with reference to the enclosed drawings, of which.

DETAILED DESCRIPTION OF PREFERRED EMBODIMENTS

The present invention relates to a single seal, especially suited for use in a pump for foodstuffs and similar. The hygiene requirements for such pumps are very stringent, entailing that the sealing package must be as smooth as possible, in order for the foodstuff pumped not to collect in pockets and minor spaces. Inside such pumps, the room for the seal is also frequently limited. Often the sealing function has been provided by box plaits with a cross section of 9×9 mm. The foodstuffs are also generally pumped under low pressure, requiring a high degree of balancing of the seal.

Figure 1:
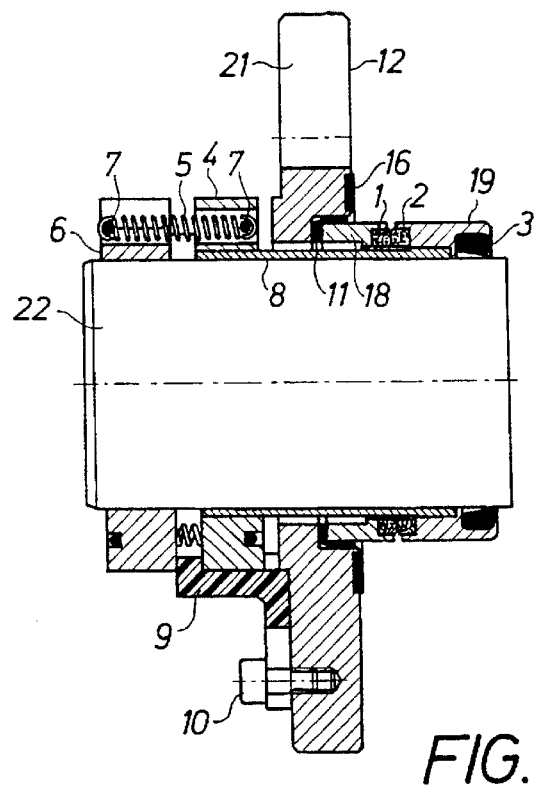
FIG. 1 is a cross sectional view of a single seal according to the invention, taken along the line B—B of FIG. 3.
Figure 2:
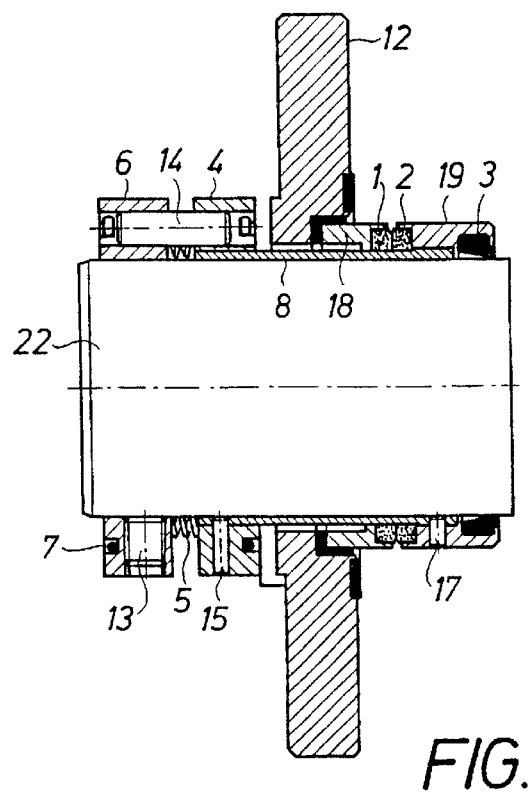
FIG. 2 is a cross sectional view taken along the line A—A of FIG. 3.
Figure 3:
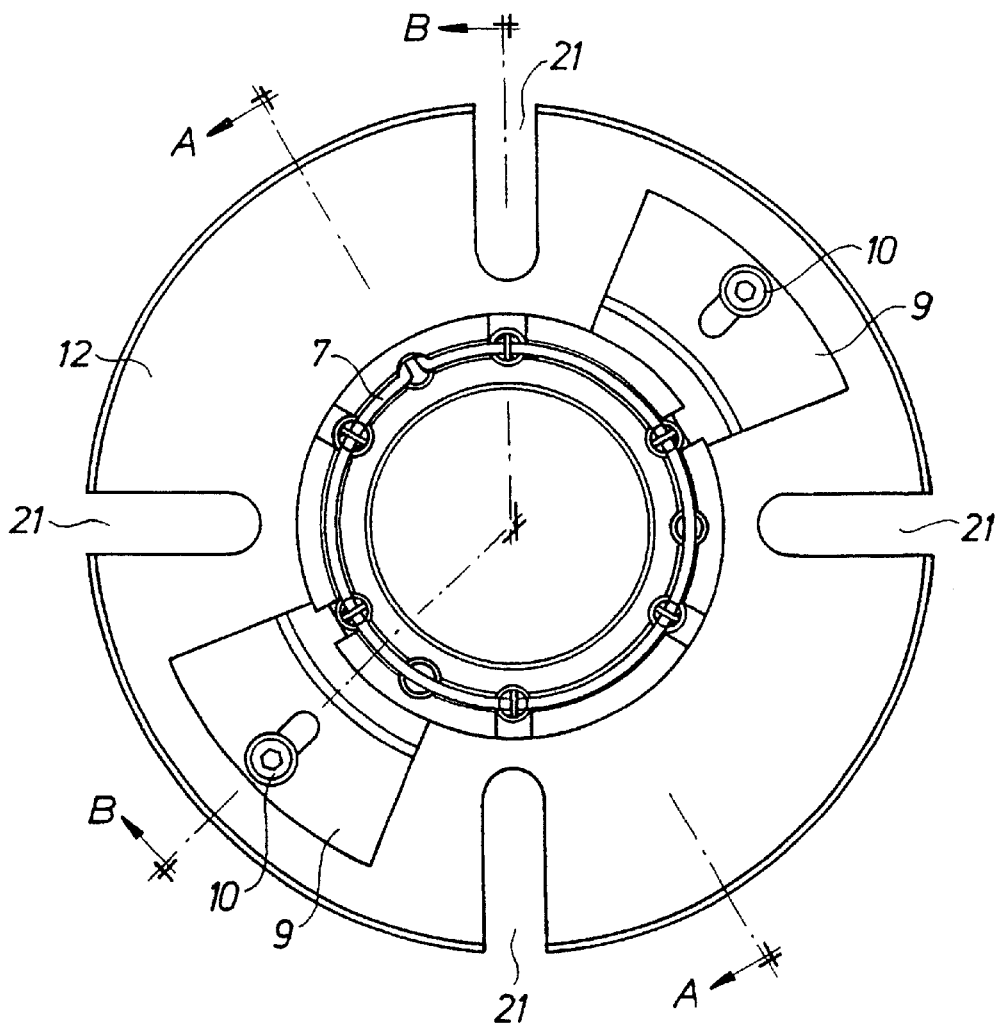
FIG. 3 is a front view of the seal according to the present invention.

The present invention provides a single seal, well fulfilling the above demands thanks to a novel design. The design is illustrated in the figures, where FIGS. 1 and 2 illustrate different cross sections as shown in FIG. 3.

Generally, the seal is delivered as a cartridge or package to be fastened to a wall (not shown) around a pump shaft 22. In FIGS. 1 and 2, the pump chamber is located to the right of the flange 12. Inside the pump chamber is a pump runner (not shown), propelling the pumped medium. In the present description, the terms "outer" and "inner" define positions in relation to the pump chamber and the outside of the flange. In other words, "outer" will be to the left in the figures, and "inner" will be to the right in the figures. In FIG. 3, four notches or recesses 21 are shown, in which screws are placed for fastening the seal to the wall of the pump housing.

As was mentioned earlier, the invention relates to a single seal, i.e. there is only one sealing surface between moving parts. The seal has an outer counter-sealing ring 1 (inside the pump housing) and an inner sealing ring 2. A retaining ring that in turn is located in a recess in the flange 12 holds the outer sealing ring 1. Between the outer retaining ring 18 and the flange 12 there is further a rubber seal in the form of a sealing sleeve 11. Between the flange 12 and the pump house wall (not shown) there is furthermore a flat seal 16.

The inner sealing ring 2 thus rotates with the shaft 22. It is held by an inner retaining ring 19 that is secured to a through axial sleeve 8 by means of a radial pin 17.

Said sleeve 8 rotates the inner sealing ring 2. The sleeve is in turn driven by a coupling on the outside (the atmospheric side) of the pump housing. The coupling has an inner drive ring 4 connected to a stop ring 6, fastened to the shaft 22 by means of a stop screw 13. The stop ring 6 drives the drive ring 4 by means of a plurality of (here three) axial pins 14 and radial pins 15, as shown in FIG. 2.

As is most clearly shown in FIG. 1, the stop ring and the drive ring are also connected by a plurality of (here six) tension springs 5. The springs 5 and the axial pins 14 are alternately located along a circle around the shaft 22. The springs 5 are retained in the outer stop ring 6 and the inner drive ring 4 by means of locking wires 7 running in grooves and being passed through eyes at the ends of the springs.

Thanks to the spring arrangement and the coupling being located outside the pump housing on the atmospheric side, the edge width of the sealing package inside the pump housing can be kept small.

The springs 5 provide a force via the sleeve 8, pulling the inner sealing ring 2 towards the outer sealing ring 1. As the entire coupling with the spring arrangement rotates with the sleeve 8, no further slide bearings are needed for transferring the force from the springs 5 to the sealing rings 1, 2. The force from the tension springs 5 functions to press the sealing rings 1, 2 against each other. The force is a complement to the hydraulic pressure inside the pump, which also acts in the same direction. Before the pump starts, there is however no overpressure in the pump housing.

When the pump is operated with for example foodstuffs, low pressures are generally used, e.g. 6 bar. In order to obtain a secure sealing function, a high degree of balancing is thus required of the sealing package. The balancing degree is the quotient between the area acted upon by the hydraulic pressure and the sealing area. In spite of the present single seal having a relatively low edge width, about 9 mm between its inner and outer diameters, the single seal has a balancing degree of about 1.3.

The seal also has few corners and areas where the pumped medium could collect and eventually cause bacteria colonies to develop when the pump is used for pumping foodstuffs.

The inner retaining ring 19 is also complemented by a rubber seal 3. This is preferably a so-called lip seal having a positive radius towards the pumped medium, allowing the pumped medium to aid in pressing the seal 3 against the shaft 22. Thus no pocket is created here either, as opposed to conventional O-ring seals.

The single seal according to the invention is also provided with transportation safety catches 9. When the seal is delivered, prior to mounting, each transportation safety catch 9 is inserted towards the centre so as to serve as a distance piece between the stop ring 6 and the drive ring 4. In this way, the springs 5 will have a correct tension and the transportation safety catches also contribute to centring the seal package around the shaft during assembly. When the transportation safety catches 9 are in operation, they are locked with screws 10. The screws 10 are loosened after having fitted the seal package onto the shaft, and the transportation safety catches are displaced towards the sides and are locked there.

The seal rings 1 and 2 themselves are preferably manufactured from a hard material, such as silicon carbide. Furthermore, they preferably have a diamond coating on the sealing surfaces. The diamond coating reduces the friction to a third of that of normal sealing materials, entailing lower heat generation and allowing the seal to handle dry friction. In operation, the seal is however lubricated by the pumped medium. The coating also has a high wear resistance. Thus, the sealing rings can handle a higher closing force.

The single seal according to the present invention thus fulfils exacting demands on dimensions, hygiene and balancing degree. The invention has been described in detail with reference to a preferred embodiment as illustrated in the drawings. A person skilled in the art will understand that dimensions, selected materials, etc. can be varied without departing from the scope of the invention. The mechanical connections with screws, pins and similar may be varied in many ways. The invention is only limited by the following claims.

What is claimed is:

1. A single seal for the sealing of a rotary shaft extending through a wall, said single seal comprising, for being mounted on a wall , a flange in order to seal off a chamber inside the wall against a rotary shaft and towards the exterior, comprising an outer sealing ring (1) and an inner sealing ring (2), said sealing rings being in sliding and sealing contact with each other, the outer sealing ring (1) being fastened to the flange (12) and the inner sealing ring (2) being fastened to an axially displaceable sleeve (8), said sleeve (8) being for affixing to and rotating with the shaft and extending through the wall and the flange (12), and a spring device (5) for arrangement outside the wall and providing a force for increasing the contact between the sealing rings (1, 2), characterised in that said spring device comprises an inner fastening ring (4) affixed to the sleeve (8), an outer fastening ring (6) for affixing to the shaft, and tension springs (5) and drive pins (14) between the inner and the outer fastening rings (4, 6).

2. The single seal according to claim 1, characterised in that six of the springs (5) and three of the driving pins (14) are alternately spaced around the flange and, thereby, the shaft.

3. A single seal according to claim 2, characterised in that the outer sealing ring (1) and the inner sealing ring (2) are held by outer and inner retaining rings (18, 19), respectively, with the outer retaining ring (18) fitted to the flange (12) with a first further seal (11) between them and the inner retaining ring (19) for fitting to the shaft with a second further seal (3) between them.

4. A single seal according to claim 3, characterised in that the outer sealing ring (1) and the inner sealing ring (2) are arranged in direct contact with the sleeve (8), said sleeve (8) in turn being arranged for direct contact with the shaft.

5. A single seal according to claim 4, characterised in that the sealing rings (1, 2) are made of silicon carbide, with a diamond coating on surfaces for the contact with each other.

6. A single seal according to claim 3, characterised in that the sealing rings (1, 2) are made of silicon carbide, with a diamond coating on surfaces for the contact with each other.

7. A single seal according to claim 2, characterised in that the outer sealing ring (1) and the inner sealing ring (2) are arranged in direct contact with the sleeve (8), said sleeve (8) in turn being arranged for direct contact with the shaft.

8. A single seal according to claim 7, characterised in that the sealing rings (1, 2) are made of silicon carbide, with a diamond coating on surfaces for the contact with each other.

9. A single seal according to claim 2, characterised in that the sealing rings (1, 2) are made of silicon carbide, with a diamond coating on surfaces for the contact with each other.

10. A single seal according to claim 1, characterised in that the outer sealing ring (1) and the inner sealing ring (2) are held by outer and inner retaining rings (18, 19), respectively, with the outer retaining ring (18) fitted to the flange (12) with a first further seal (11) between them and the inner retaining ring (19) for fitting to the shaft with a second further seal (3) between them.

11. The single seal according to claim 10, characterised in that the second further seal (3) is a lip type seal.

12. A single seal according to claim 11, characterised in that the outer sealing ring (1) and the inner sealing ring (2) are arranged in direct contact with the sleeve (8), said sleeve (8) in turn being arranged for direct contact with the shaft.

13. A single seal according to claim 12, characterised in that the sealing rings (1, 2) are made of silicon carbide, with a diamond coating on surfaces for the contact with each other.

14. A single seal according to claim 11, characterised in that the sealing rings (1, 2) are made of silicon carbide, with a diamond coating on surfaces for the contact with each other.

15. A single seal according to claim 10, characterised in that the outer sealing ring (1) and the inner sealing ring (2) are arranged in direct contact with the sleeve (8), said sleeve (8) in turn being arranged for direct contact with the shaft.

16. A single seal according to claim 15, characterised in that the sealing rings (1, 2) are made of silicon carbide, with a diamond coating on surfaces for the contact with each other.

17. A single seal according to claim 10, characterised in that the sealing rings (1, 2) are made of silicon carbide, with a diamond coating on surfaces for the contact with each other.

18. A single seal according to claim 1, characterised in that the outer sealing ring (1) and the inner sealing ring (2) are arranged in direct contact with the sleeve (8), said sleeve (8) in turn being arranged for direct contact with the shaft.

19. A single seal according to claim 18, characterised in that the sealing rings (1, 2) are made of silicon carbide, with a diamond coating on surfaces for the contact with each other.

20. A single seal according to claim 1, characterised in that the sealing rings (1, 2) are made of silicon carbide, with a diamond coating on surfaces for the contact with each other.

21. A single seal for the sealing of a rotary shaft extending through a wall, the single seal comprising:

a flange (12) for mounting to a wall with a rotary shaft extending therethrough, the flange having first and second axially opposite sides;

a sleeve (8) extending through the flange for rotation with, axial displacement of and sealing contact about the rotary shaft;

a first sealing ring (1) and a second sealing ring (2) for sliding and sealing contact with each other, the first sealing ring being fastened to the first side of the flange and the second sealing ring being fastened to the sleeve on the first side of the flange;

a first fastening ring (4) affixed to the sleeve on the second side of the flange;

a second fastening ring (6) for affixing to the rotary shaft on the second side of the flange;

at least one spring (5) between the first and second fastening rings for axially displacing the first fastening ring and sleeve in a direction to increase the sliding and sealing contact of the first and second sealing rings; and at least one drive pin (14) between the first and second fastening rings for rotating the first fastening ring and sleeve with the shaft.

\* \* \* \* \*